(12) United States Patent
Wargent

(10) Patent No.: US 10,517,225 B2
(45) Date of Patent: Dec. 31, 2019

(54) METHOD TO IMPROVE CROP YIELD AND/OR QUALITY

(71) Applicant: Biolumic Limited, Palmerston North (NZ)

(72) Inventor: Jason John Wargent, Palmerston North (NZ)

(73) Assignee: BIOLUMIC LIMITED, Palmerston North (NZ)

(*) Notice: Subject to any disclaimer, the term of this patent is extended or adjusted under 35 U.S.C. 154(b) by 232 days.

(21) Appl. No.: 15/125,698

(22) PCT Filed: Mar. 16, 2015

(86) PCT No.: PCT/NZ2015/000014
§ 371 (c)(1),
(2) Date: Sep. 13, 2016

(87) PCT Pub. No.: WO2015/137825
PCT Pub. Date: Sep. 17, 2015

(65) Prior Publication Data
US 2017/0000041 A1    Jan. 5, 2017

(30) Foreign Application Priority Data

Mar. 14, 2014  (NZ) ..................................... 622482

(51) Int. Cl.
*A01G 7/04*    (2006.01)
*F21V 14/02*   (2006.01)
*F21Y 115/10*  (2016.01)

(52) U.S. Cl.
CPC .............. *A01G 7/045* (2013.01); *F21V 14/02* (2013.01); *F21Y 2115/10* (2016.08)

(58) Field of Classification Search
CPC ............. A01G 7/045; A01G 7/04; A01G 9/20
See application file for complete search history.

(56) References Cited

U.S. PATENT DOCUMENTS

| | | | |
|---|---|---|---|
| 7,348,475 B2 | 3/2008 | Shin et al. | |
| 8,001,722 B2 | 8/2011 | Wilson et al. | |
| 8,845,149 B2 | 9/2014 | Cheng et al. | |
| 2006/0016125 A1* | 1/2006 | Krauss | A01G 7/045 47/58.1 R |
| 2008/0120736 A1 | 5/2008 | Hurst | |
| 2008/0298052 A1 | 12/2008 | Hurst et al. | |
| 2009/0272029 A1 | 11/2009 | Aiking et al. | |
| 2010/0193707 A1 | 8/2010 | Yamada et al. | |
| 2011/0163246 A1* | 7/2011 | Ishiwata | A01G 7/045 250/492.1 |
| 2012/0054061 A1 | 3/2012 | Fok et al. | |
| 2013/0008085 A1* | 1/2013 | Aikala | A01G 7/045 47/58.1 LS |
| 2013/0294065 A1 | 11/2013 | Wells | |
| 2014/0204567 A1 | 7/2014 | Cheng et al. | |
| 2016/0073599 A1 | 3/2016 | Wargent | |
| 2016/0184237 A1* | 6/2016 | Lowe | A01G 22/00 514/733 |
| 2016/0345512 A1* | 12/2016 | Wargent | H05B 33/0869 |

FOREIGN PATENT DOCUMENTS

| | | |
|---|---|---|
| CN | 103999748 A | 8/2014 |
| DE | 19900616 A1 | 7/2000 |
| EP | 1300066 A1 | 4/2003 |
| EP | 2172097 A1 | 4/2010 |
| JP | 2005328734 A | 12/2005 |
| JP | 2006158262 A | 6/2006 |
| JP | 2013051939 A | 3/2013 |
| NZ | 702063 A | 11/2016 |
| TW | M458082 U | 8/2013 |
| WO | WO-0051414 A1 | 9/2000 |
| WO | WO-2012040838 A1 | 4/2012 |
| WO | WO-2012085336 A1 | 6/2012 |
| WO | WO-2015119510 A1 | 8/2015 |
| WO | WO-2015137825 A1 | 9/2015 |
| WO | WO-2016043605 A1 | 3/2016 |
| WO | WO-2016054268 A1 | 4/2016 |
| WO | WO-2018037281 A1 | 3/2018 |
| WO | WO-2019002946 A1 | 1/2019 |
| WO | WO-2019038594 A2 | 2/2019 |

OTHER PUBLICATIONS

Mishra, A. Effect of UVB radiation on seed germination, seedling growth, photosynthetic pigments and biochemical responses of *Postum sativum* (L.). Photosynthetic Pigments and Biochemical Responses of *Pistum sativum* (L.) Zenith International Journal of Multidisciplinary Research, vol. 5(1), pp. 124-129 (2015).
Behn, H. et al. Development-dependent UV-B Responses in Red Oak Leaf Lettuce (*Lactuca sativa* L.): Physiological Mechanisms and Significance for Hardening, European Journal of Horticultural Science vol. 76, No. 2, pp. 33-40 (Jul. 2011).
Davey, M.P. et al. The UV-B photoreceptor UVR8 promotes photosynthetic efficiency in *Arabidopsis thaliana* exposed to elevated levels of UV-B, Photosynthesis Research, 2012, vol. 114, pp. 121-131.
Favory et al. Interaction of COP1 and UVR8 regulates UV-B-induced photomorphogenesis and stress acclimation in *Arabidopsis*, Embo Journal, 28(5); 591-601 (2009).
Heil et al. Induced systemic resistance (ISR) against pathogens—a promising field for ecological research, Perspectives in Plant Ecology, Evolution and Systematics, vol. 4, 2001, pp. 65-79.
Iarc Monographs on the Evaluation of Carcinogenic Risks to Humans. vol. 55—Solar and ultraviolet radiation; Chapter 1; Exposure data (1992) (International Agency for Research on Cancer—World Health Organization).

(Continued)

*Primary Examiner* — Kristen C Hayes
(74) *Attorney, Agent, or Firm* — Wilson Sonsini Goodrich & Rosati

(57) ABSTRACT

A method, and a device for administering the method, of treating a plant seedling to improve long term hardiness and/or crop yield and/or quality characterised by the step of exposing the plant seedling, prior to a subsequent growth phase, to ultraviolet (UV) irradiation with at least one wavelength, only between 280-310 nm. The method further including the step of selecting a plant seedling or seedlings for a subsequent growth phase.

7 Claims, 1 Drawing Sheet

(56) References Cited

OTHER PUBLICATIONS

Ibdah et al. Spectral dependence of flavonol and betacyanin accumulation in Mesembryanthemum crystallinum under enhanced ultraviolet radiation, Plant, Cell and Environment 25: 1145-1154 (2002).
International Application No. PCT/NZ2015/000008 International Preliminary Report on Patentability dated Apr. 19, 2016.
International Application No. PCT/NZ2015/000008 Written Opinion dated Jan. 14, 2016.
International Application No. PCT/NZ2015/000014 International Preliminary Report on Patentability dated Nov. 16, 2015.
International Application No. PCT/NZ2015/000014 Written Opinion dated Jun. 3, 2015.
International Application No. PCT/NZ2015/050153 International Search Report dated Nov. 23, 2015.
International Application No. PCT/NZ2015/050153 Written Opinion dated Feb. 18, 2016.
Jenkins, G.I. Signal Transduction in Responses to UV-B Radiation, Annual Review of Plant Biology, vol. 60, 2009, pp. 407-431.
Kubasek, W.L. et al. Regulation of flavonoid biosynthetic genes in germinating *Arabidopsis* seedlings, The Plant Cell, 1992, vol. 4, pp. 1229-1236.
Li, X. et al. Effect of UV-B irradiation on seed germination and seedling growth of *Arabidopsis*, Chinese Bulletin of Botany, 2013, vol. 48, pp. 52-58.
Marzocca, A. et al. Tratamiento de semillas de 'Kok-saghyz con rayos ultravioletas', Revista de Investigaciones Agrícolas, 1957, vol. XI, pp. 227-245.
Sosa-Flores, V. P. et al. Study of morphological and histological changes in melon plants grown from seeds irradiated with UV-B, Journal of Applied Horticulture, Oct.-Dec. 2014, vol. 16, pp. 199-204.
Rizzini, L. et al. Perception of UV-B by the *Arabidopsis* UVR8 Protein, Science vol. 332, No. 6025; pp. 103-106 (2011).
Rozema, J. et al. UV-B as an environmental factor in plant life: stress and regulation, Trends in Ecology & Evolution, vol. 12, 1997, pp. 22-28.
Shaukat, S.S., et al. Effect of Supplemental UV-B Radiation on Germination, Seedling Growth, and Biochemical Responses of Sunflower (*Helianthus annuus* L.). Fuuast Journal of Biology vol. 1, No. 1, pp. 27-33 (2011).
Siddiqui, S. et al. Effect of UV-B radiation on seed germination, plant height, foliage and seed yield of soybean (*Glicine max* L. Merrill), Progressive Agriculture, 2007, vol. 7, pp. 42-45.
Vallad et al. Systemic Acquired Resistance and Induced Systemic Resistance in Conventional Agriculture, Crop Science, vol. 44: 1920-1934 (2004).
Vyn, T.J. et al. Potassium fertilization effects on isoflavone concentrations in soybean [*Glycine max* (L.) Merr.], Journal of Agricultural and Food Chemistry, 2002, vol. 50, pp. 3501-3506.
Wargent, J.J. et al. Increased exposure to UV-B radiation during early development leads to enhanced photoprotection and improved long-term performance in *Lactuca sativa*, Plant, Cell & Environment, 2011, vol. 34, pp. 1401-1413.
Wu, M. et al. Computational Evidence for the Role of *Arabidopsis thaliana* UVR8 as UV—B Photoreceptor and Identification of Its Chromophore Amino Acids, Journal of Chemical Information and Modeling, 2011, vol. 51, pp. 1287-1295.
European Patent Application No. EP15746659.0 Extended European Search Report dated Oct. 11, 2017.
European Application No. 15761440.5 Extended European Search Report dated Sep. 19, 2017.
U.S. Appl. No. 14/857,486 Non-Final Office Action dated Jun. 16, 2017.
European Application No. 15841342.7 European Search Report dated Feb. 13, 2018.
International Application No. PCT/162017/001152 International Search Report and Written Opinion dated Nov. 8, 2017.
Kakani, VG et al. Field crop responses to ultraviolet-B radiation: a review. Agricultural and Forest Meteorology, 120(1-4):191-218 (Dec. 24, 2003).
Liu, Bing et al. Effects of enhanced UV-B radiation on seed growth characteristics and yield components in soybean. Field Crops Research, 154:158-163 (2013).
Ozbolt, L. et al. Distribution of selenium and phenolics in buckwheat plants grown from seeds soaked in Se solution and under different levels of UV-B radiation. Food Chemistry 110(3):691-696 (Oct. 1, 2008).
Besteriro et al. Arabidopsis MAP kinase phosphatase 1 and its target MAP kinases 3 and 6 antagonistically determine UV-B stress tolerance, independent of the UVR8 photoreceptor pathway. Plant Journal 58:727-737 (2011).
Chen et al. Shoot-to-Root Mobile Transcription Factor HY5 Coordinates Plant Carbon and Nitrogen Acquisition. Curr Biol 26(5):640-646 (Mar. 2016).
Cluis et al. The *Arabidopsis* transcription factor HY5 integrates light and hormone signaling pathways. Plant J 38(2):332-347 (2004).
Ebisawa et al. Supplementary ultraviolet radiation B together with blue light at night increased quercetin content and flavonol synthase gene expression in leaf lettuce (*Lactuca sativa* L.). Environmental Control in Biology 46(1):1-11 (2008).
Folta et al. Light as a Growth Regulator: Controlling Plant Biology with Narrow-bandwidth Solid-state Lighting Systems. Hortscience 43:1957-1964 (2008).
Gangappa et al. The Multifaceted Roles of HY5 in Plant Growth and Development. Mol Plant 9(10):1353-1365 (Oct. 2016).
Huche-Thelier et al. Light signaling and plant responses to blue and UV radiations-Perspectives for applications in horticulture. Environmental and Experimental Botany, Elsevier, Amsterdam, NL 121:22-38 (2015).
International Application No. PCT/162018/000839 International Search Report and Written Opinion dated Oct. 18, 2018.
International Application No. PCT/162018/001056 International Search Report and Written Opinion dated Apr. 3, 2019.
Jansen. Low threshold levels of ultraviolet-B in a background of photosynthetically active radiation trigger rapid degradation of the D2 protein of photosystem-II. The Plant Journal 9(5):693-699 (1996).
Japanese Application No. 2016-556020 Office Action dated Dec. 30, 2018.
Lee et al. Analysis of transcription factor HY5 genomic binding sites revealed its hierarchical role in light regulation of development. Plant Cell 19(3):731-749 (2007).
Lydon et al. UV-B Radiation Effects on Photosynthesis. Growth and Cannabinoid Production of Two Cannabis Sativa Chemotypes. Photochemistry and Photobiology 46(2):201-206 (1987).
Musil et al. Ultraviolet-B Irradiation of Seeds Affects Photochemical and Reproductive Performance of the Arid-Environment Ephemeral Dimorphotheca Pluvialis. Environmental and Experimental Botany 34(4):371-378 (1994).
Qaderi et al. Morphological and physiological responses of canola (*Brassica napus*) siliquas and seeds to UVB and CO2 under controlled environment conditions. Environmental and Experimental Botany 60:428-437 (2007).
Setlow. The Wavelengths in Sunlight Effective in Producing Skin Cancer: A Theoretical Analysis. PNAS 71:3363-3366. (1974).
Tepfer et al. Survival of Plant Seeds, Their UV Screens, and nptll DNA for 18 Months Outside the International Space Station. Astrobiology 12:517-528 (2012).
U.S. Appl. No. 14/857,486 Advisory Office Action dated Jul. 27, 2018.
U.S. Appl. No. 15/117,157 Office Action dated Apr. 3, 2019.
U.S. Appl. No. 14/857,486 Non-Final Office Action dated Apr. 18, 2018.
Zoratti et al. Light-controlled flavonoid biosynthesis in fruits. Frontiers in Plant Science 5(534):16 pgs (2014).

\* cited by examiner

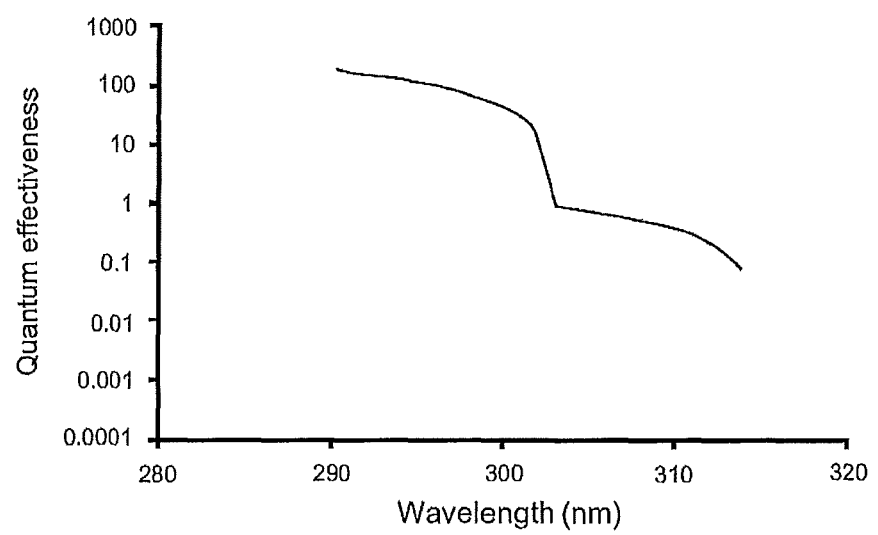

METHOD TO IMPROVE CROP YIELD AND/OR QUALITY

TECHNICAL FIELD

This invention relates to a method to improve crop yield and/or quality through UV exposure.

BACKGROUND ART

In the past, methods to improve crop yield and quality have typically relied on fertilisers and other chemicals, or genetic breeding programs to select for beneficial traits. Alternatively, careful manipulation or control of the environmental factors during crop growth such as temperature or irrigation is almost always used to improve crop outcomes.

These systems have certain advantages, yet also certain disadvantages.

For instance, fertilisers and chemicals can lead to environmental pollution, cost money and time to apply to crops and often garner consumer disapproval.

Genetic breeding has many advantages, yet it can be a slow process, and is often difficult to control the phenotypic outcome. For instance, whilst one commercially important trait may be improved (such as disease resistance), it may come at a cost to a deleterious trait such as taste or colour.

Finally, careful control of growth conditions before harvest certainly is important. Yet less hardy plants often die due to stresses in the outdoor environment regardless of this control of growth conditions, and this leads to a net loss of production.

Historically, UV radiation has been seen as a detrimental treatment to plant seedlings. Yet, in more recent years, research has focused on treatment of certain plants with ultraviolet (UV) radiation and visible light to improve defense/protection mechanisms.

Behn et al.[1] shows exposure of lettuce seedlings with filtered natural sunlight, containing UV-B, UV-A and visible light led to improved stress tolerance, but as a trade off led to a loss of biomass accumulation, thought to be due to a redirection of carbohydrate substrate from growth to secondary metabolism (i.e. protection mechanisms). Whilst the plants showed improved defense/protection, crop yield and quality diminished.

[1] Europ. J. Hort. Sci., 76(2). S. 33-40, 2011, ISSN 1611-4426

WO 2012/085336 describes a device to deliver a combination of UV-A (315-400 nm), UV-B (280-315), violet and blue (400-500 nm) and red and far red (600-800 nm) light, optionally also with green and yellow light (500-600 nm). The device was used to treat tree seedlings and it was suggested this prevented transplantation shock while the plants are moved from an indoor setting to an outdoor setting for plant growth. Specifically, it discloses that the device's treatment shortened the growth cycle of tree seedlings, enhances the proportion of viable seedlings and eliminates one work phase in the growth process (e.g. removing the need for sunshade curtains), thus improving the economics of seedling cultivation. Yet, WO 2012/085336 is only focused on seedling viability and the economics of seedling cultivation, not towards improving crop yield and/or quality. Additionally, it relies on multiple UV wavebands, which may complicate the treatment process and/or may lead to undesirable traits, for instance those as described in Behn et al. All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

It is an object of the present invention to address the foregoing problems or at least to provide the public with a useful choice.

Further aspects and advantages of the present invention will become apparent from the ensuing description which is given by way of example only.

DISCLOSURE OF THE INVENTION

According to a first aspect of the present invention there is provided a method of treating a plant seedling to improve long term hardiness and/or improve crop yield and/or crop quality characterised by the step of exposing the plant seedling, prior to a subsequent growth phase, with ultraviolet (UV) irradiation with at least one wavelength only between 280-310 nm.

According to another aspect of the present invention there is provided a device to administer ultraviolet (UV) irradiation to a plant seedling, characterised in that the device is configured to administer ultraviolet (UV) irradiation with at least one wavelength only between 280-310 nm.

According to another aspect of the present invention there is provided a method of improving long term hardiness and/or crop yield and/or crop quality
including the step of
a) exposing a plant seedling or seedlings prior to a subsequent growth phase, with ultraviolet (UV) light with at least one wavelength only between 280-310 nm
further characterised by the step of
b) selecting, or determining an appropriate level of hardiness in, a plant seedling or seedlings for the subsequent growth phase.

According to another aspect of the present invention there is provided a plant seedling, plant or harvestable crop which has been treated using the methods described herein.

Brief Outline of Inventive Concept(s) and Advantages

This method of treating the plant seedlings was surprisingly found to increase crop yield and/or quality. A direct correlation is observed between treatment of plant seedlings with specific wavelengths in the UV-B spectrum and commercially important crop yield and quality. Part of this set of wavelengths is not found in the sunlight reaching the earth's surface, and is therefore differentiated from any form of treatment using natural sunlight.

Furthermore, the treatment also still appears to achieve desirable or improved hardiness (i.e. protection) from stresses such as abiotic and biotic stresses.

For instance, in preliminary trials, cucumbers were shown to have an increased resistance/protection to cold stress (abiotic stress reduction) in older plants at final harvest 12 days after initial UV treatment of cucumber seedlings.

As another example, green lettuce was shown to have an increased resistance to fungal disease (biotic stress reduction) even in older plants. This illustrates the follow-on protective effects of the UV-treatment in older plants. Importantly, in both examples, crop yields were also increased at harvest. Therefore, the present invention is providing increased hardiness, and unlike Behn et al., also improved crop yield and quality. Behn et al taught away from the results of the present invention because it directed the reader to UV treatment causing the plants to build protection mechanisms at the loss of increased crop yield.

Additionally, unlike Behn et al., the treatment of the present invention only requires UV irradiation in one defined spectrum (and specifically only a subset of that), whereas Behn et al. had uncontrolled treatment in UV-A, UV-B and visible light, via filtered natural sunlight. It is presently unclear as to what biochemical mechanisms may be leading to the results seen in the present invention, and perhaps also those in Behn et al., as the biochemistry relating to plant growth and protection are complex and still very far from being fully understood.

Unlike prior art broad spectrum UV treatment methods for improving stress resistance (e.g. to avoid transplantation shock), the present invention uses treatments within only one UV spectrum (within UV-B) which may substantially ease the treatment process and equipment needed.

Additionally, many treatments utilise sunlight as a UV-B, UV-A and visible source, and result in a lack of specificity of dosage, often leading to undesirable and/or unpredictable results. The present invention avoids this unpredictability due to only using specific wavelengths in a single defined waveband in the treatment. This does not rule out that the plant seedling may be exposed to other background light during, but does not necessarily form part of, the treatment.

The inventor surprisingly found that using a wavelength or wavelengths in a specific and narrow focused range within UV-B radiation between 280-310 nm led to the beneficial results. In other words, part of the UV-B spectrum above about 310 nm did not lead to the beneficial results seen. As will be discussed further, the UV-B spectrum covers 280 nm to about 315 nm (however, defined separations between UV wavebands are approximate, and are subject to at least two common variations in the literature, i.e. including an upper limit for UV-B of 320 nm[2]). It is possible that broader treatment within the UV-B spectrum or uncontrolled UV treatment may leads to deleterious results. Preliminary results conducted by the inventor support this.

[2]IARC monographs on the evaluation of carcinogenic risks to humans. Volume 55—Solar and ultraviolet radiation; Chapter 1; Exposure data (1992).

The long term hardiness of the plant refers to improved resistance to stresses encountered such as weather damage, sun exposure, disease and/or insect pest attack during the growth phase of the plant prior to harvest. Without wishing to be bound by theory, the commercial end result of an improved yield and/or quality of the crop at harvest is thought be at least partially attributed to an improved long-term hardiness resulting from the treatment. Regardless, the end result of improved crop yield and/or quality is observed as a result of this treatment method.

Additionally, it was found that using UV radiation outside of the UV-B range (for example the UV-A or UV-C wavelengths) did not lead to the same results. Preliminary studies (not shown) supported this. Also, preliminary studies provided in the Best Modes section shows the beneficial effects dramatically diminish or disappear entirely when moving out of the UV-B spectrum, for instance into the UV-A spectrum (400 to 315 nm).

The invention is intended to help to improve quality of the crop because of improved taste, size, shape, colour, texture, visual appearance, shelf life and/or ability to withstand post-harvest handling. A further advantage of the present invention is the ability to track, select for, or predict for plants that will display improved hardiness and/or crop yield/quality following the described UV treatment. This may be beneficial to reduce attrition of plants prior to harvest, and therefore improve crop quality and/or yield.

Definitions and Preferred Embodiments

Throughout the specification the phrase "prior to a subsequent growth phase" should be taken as meaning either prior to the plant seedling being transferred into an outdoor environment, or in some cases being retained indoors, at a particular time point based on the age, size other feature of the plant seedling or environmental characteristics. The growth phase of the plant is typically the phase when the plant exhibits substantial growth and development into a mature plant prior to harvesting.

Throughout this specification the term "hardiness" should be taken as meaning the ability of a plant to withstand or help protect against one or more stresses during crop production and which may allow for more desirable yield and/or quality of the plant at harvesting.

Throughout this specification the term "plant seedling" should be taken as meaning a young plant following germination from a seed. The plant seedling may be of a vegetable, fruit, tree, shrub, herb, grass origin, and so forth.

Throughout this specification the term "plant" should be taken as meaning a matured plant seedling which is ultimately used for crops or other applications.

Although the present invention has particular application to vegetable and fruit crop production, it is also possible the invention may be used to improve other types of plant hardiness such as trees, grasses, flowers, herbs and so forth. For simplicity, the remainder of the specification will refer to crop production (and particularly vegetables), although it should be appreciated this is not intended to be limiting.

Throughout this specification the term "crop" should be taken as meaning a cultivated plant which is harvested typically by a human or machine at some point during its growth stage for further use or human consumption. However, it should be appreciated that application of the methods to grasses, trees and so forth, may be used merely to improve the hardiness without any intention to harvest.

Throughout this specification the term "indoors" should be taken as meaning a housing, typically a greenhouse, plastic polytunnel, a shade cloth with no walls, or fully indoor system which might use artificial lighting.

In the example of a greenhouse, it may include transparent walls and/or ceiling to allow natural light in. The indoor housing may used to allow the initial germination and seedling development phase to occur and is used during the UV irradiation exposure of the present invention prior to a subsequent growth phase in an outdoor environment.

Preferably, the treatment of the plant seedlings occurs indoors.

The advantage of conducting the treatment indoors is that it may help to regulate the conditions whilst the plant seedling is particularly vulnerable. Additionally, it means that the device used to apply the UV treatment may be better protected and secured. However, it is possible the treatment of the present invention may also be conducted in an outdoor environment, depending on the circumstances and type of seedlings to be treated.

Throughout this specification the term "transplantation" should be taken as meaning the act of transferring the plant seedling into an outdoor environment such as a field to allow continued growth prior to ultimate harvesting of the crops. The term transplantation shock refers specifically to the stress or shock incurred by the plant at the time of transplantation, for instance due to sun shock due to the different sun exposure seen between indoors and the outdoor environment.

Throughout this specification the term "ultraviolet (UV) irradiation" should be taken as meaning electromagnetic radiation with a wavelength shorter than visible light, but longer than X-rays, and is in between the range of 10 nm to 400 nm (corresponding to 3 eV to 124 eV). The ultraviolet (UV) irradiation spectrum is considered to be invisible to humans, and therefore differentiated from visible light in the spectrum of about 400 nm to 700 nm.

The ultraviolet spectrum can be further broken down into UV-A (400-320 nm), UV-B (320-280 nm) and UV-C (280-100 nm).

It should be appreciated that LED lights are configured to administer a peak irradiance wavelength of light, for instance centred around 290 nm.

Contrary to the prior art, the inventor found that use of other UV wavelengths such as UV-A or UV-C in combination with the specific UV-B treatment is not considered to be necessary (and, may actually be detrimental) to providing the beneficial effects seen in terms of improved hardiness and/or crop quality and/or yield. Additionally, other wavelengths outside of the 280-310 nm UV-B treatment do not substitute for the beneficial effects seen. Therefore this represents a significant advantage over treatment methods which use multiple wavelengths in more than one spectrum.

Preferred Treatment Regime

It should be appreciated that the preferred dosage regime(s) may vary and take into account various parameters including:
 the type of seedling,
 the intensity of the UV light (W m$^{-2}$ s$^{-1}$),
 the length of treatment (days) and
 the rest period (on/off) between each UV application during treatment.

For instance, the length of treatment may be kept shorter to about 2-4 days, but as a result a higher intensity of UV irradiation may be used to provide a sufficient dosage during the treatment period. One consideration is that higher intensities may be more likely to lead to seedling damage, so sufficient rest periods during each application may be particularly useful. Additionally, co-administration with blue and red visible light (as will be discussed below) may be particularly useful.

Additionally, it should be appreciated that the UV exposure time, timing of UV exposure to the seedling following germination, temperature, number of cycles, the particular UV wavelength may each be altered to suit different plant varieties, yet still keep within the spirit of the invention.

Preferably, the method includes exposing the plant seedling to UV light for approximately 2-15 days.

The inventor found that treatment for less than about two days did not provide sufficient dosage to most seedling types. Treatment for over about 15 days did not offer any practical advantages, and commercially would become more of an unnecessary burden.

More preferably, the method includes exposing the plant seedling to UV light for approximately between 4 to 7 days.

The inventor found that a treatment between 4 to 7 days offered a beneficial time frame whilst also managing other factors in the dosage, such as UV intensity to avoid unnecessary damage to the seedlings. Preferably, the method includes exposing the plant seedling to cyclic exposure of UV light.

In one example, the UV exposure may be provided as approximately 12 hours on, 12 hours off over a period of seven days. In another example, the UV exposure may be provided 10 minutes per day for a week. It should be appreciated that different conditions may suit different plant varieties and/or specific outcomes desired by the grower.

Preferably, the method includes maintaining the temperature at approximately between 12° C. to 35° C. during the treatment.

This may be useful to avoid temperature damage to the seedlings during the treatment stage.

Preferably, the method includes exposure to UV wavelength of approximately between 280-305 nm.

Surprisingly, the preliminary results show that the beneficial effects are most pronounced within a narrower band of the UV-B spectrum, particularly between 280-305 nm.

Beneficial results are still seen beyond 305 nm, but the beneficial results drop sharply after moving beyond a wavelength of about 310 nm.

For example, a UV light treatment peaking at 319 nm is still within the UV-B waveband of the spectrum, yet do not appear to produce desired effects. The present invention surprisingly uses wavelengths in the short-wave range of the UV-B spectrum, a proportion of which exist outside of the natural spectrum of sunlight that reach the earth's surface. In trials, UV treatment in the UV-A spectrum (at 354 nm) was not seen as effective to improve hardiness, nor was treatment in the UV-C spectrum (at 270 nm; data not shown).

More preferably, the method includes exposure to a peak UV wavelength of approximately between 280-290 nm.

In preliminary trials, treatment with UV light peaking between 280-290 nm showed the most promising results.

It should be appreciated that the treatment method may actually include only a specific wavelength (or at least a wavelength peak) between 280-310 nm, and therefore there is no requirement to cover the entire range to provide the desired effects.

Also, it should be appreciated the that the crux of the present invention is that the treatment includes at least one peak wavelength within only 280-310 nm, yet due to the bell-curve shaped peak resulting from UV-B irradiation, a very small amount of this UV light administered may extend partially outside of the 280-310 nm range. The present invention as described should be considered to encompass such insignificant background irradiation. This effect would be minor and would be appreciated by someone skilled in the art to have no real influence on the invention's benefits.

Optionally, one may alter the wavelength within the 280-310 nm range during the method treatment for a given plant species. Equally, one may apply a combination of different wavelengths within the UV-B spectrum concurrently.

Preferably, the method also includes exposing the plant seedling to visible light in the range of 400 to 800 nm. The visible light may be administered concurrently with the UV light, or separately.

Notably, visible light is not UV-light and therefore is distinguishable from prior art treatments in Behn et al and WO 2012/085336 which utilised both UV-B and UV-A in the treatment.

The inclusion of visible light is thought to be particularly beneficial to help prevent any DNA damage to the plants potentially arising from the UV exposure according to the present invention. It may also help the beneficial hardiness characteristics obtained by the UV exposure to prevail.

Preferably, the treatment includes blue visible light between 400 to 500 nm, or more preferably 455 to 492 nm.

Blue visible light is considered to be particularly beneficial to help avoid possible deleterious effects of UV damage to DNA. In other words, blue light is considered to be beneficial for photo-repair.

Preferably, the treatment includes red visible light between 655-680 nm.

The benefits of red visible light are complementary effects on plant growth, such as regulation of stem growth. Red light is a useful, but not essential, element of the method.

Also, the treatment conditions may depend on the type of device that is utilised, as a particular device may be particularly efficient at administering the UV light.

Application to Different Types of Seedlings

Preferably the plant seedling is selected from the group consisting of fruit and vegetables.

Preferably the plant seedling is selected from the group consisting of green lettuce, red lettuce, tomato, cucumber, broccoli, herb crops and eggplant.

Although not limited to these crops, the Applicant has clearly shown improved crop yield and/or quality as a result of the treatment method as claimed. These crops also represent commercially important crops where the method is deemed to be particularly applicable. However, based on such exemplification, it is clear that the method may also be applicable to a wide variety of other crop types without limitation.

Device

It should be appreciated that a device used to perform the present invention may be that described according to the previously filed New Zealand Patent Application Number 621039 filed on 10 Feb. 2014 by the same Applicant, the entire contents of which are hereby incorporated into the present application by reference.

The Applicant's device as described in NZ 621039 has the ability to administer a wide range of treatments beyond that described in the present invention. However, the device may be configured to specifically treat plant seedlings as per the methodology described herein, and is considered a particularly useful device to use.

Specifically, the device has the ability to administer a pre-defined UV dosage regime such as those described in the present application and wherein parameters preferably used in the present invention may be easily adjusted and controlled.

Preferably, the device includes a moving conveyor which alters the relative positions of at least one light emitters and the target area during the treatment. We refer to this in the Best Modes as a moving array light treatment.

In this way a large number of plant seedlings may be conveniently and accurately treated during the treatment phase as the conveyor moves the position of the light emitters.

Preferably, the device administers UV light according to the present invention via light emitting diodes (LEDs).

Additionally, the Applicant's device has the ability to co-administer visible light which is beneficial for the reasons discussed above.

Potential Methods to Quantify or Predict Hardiness and/or Improved Crop Yield or Quality It should be appreciated that there are a range of methods that can be used to evaluate young plants, but that no single and fully effective method currently exists, particularly as related to the use of UV light to promote yield and/or quality in crops at harvest, as described here.

One such method to evaluate the benefits of the invention is a "Hardiness index" as described below in detail. This is an integrated method for assessing the response of seedlings to UV light, as related to key combined physiological changes in plants in response to the treatment. In other words, the observation of several key physiological responses which have occurred simultaneously is one indication that plants have responded to treatment in a manner which should be beneficial for long term plant growth and subsequently improved crop yield and/or quality.

It should be appreciated that seedlings of different crop type, variety, and growing location may require amended hardiness indices, in order to fully assess hardiness in those particular seedlings. Amendments to the hardiness index may include the integration of other seedling or growing environment variables as required.

Hardiness Index

Throughout this specification the term hardiness index is defined according to the calculation provided below, $$H = \frac{SDW^T}{SDW^N} + \frac{SSLW^T}{SSLW^N} + \frac{1/SLA^T}{1/SLA^N}$$

wherein:
H=Hardiness
SDW=Shoot dry weight
SSLW=Shoot specific leaf weight
SLA=Shoot leaf area
$^T$=Treated plants; and
$^N$=Non treated plants.

The shoot specific leaf weight (SSLW) defines the ratio of the dry weight of the leaf per unit leaf area, whereas the term shoot leaf area (SLA) simply defines the leaf area.

Furthermore, it should be appreciated that the use of the "1/SLA" function may be merely to provide a positive H value for ease of reference, and is not essential to the invention.

Without this 1/SLA function, the H value may be more difficult (but not impossible) to comprehend in certain circumstances. This is because the H value may, in some cases, decrease with improved hardiness. This result may arise when the plant's shoot leaf area (SLA) increases as a result of UV exposure according to the present invention. This increase in SLA may be seen as an improvement to hardiness in some plant varieties.

Yet, in other plant varieties, UV treatment may lead to an increase in SLA, which may actually increase hardiness in that variety. In such a case, it may be beneficial to adapt the Hardiness index as shown below, such that the SLA is not 1/SLA.

$$H = \frac{SDW^T}{SDW^N} + \frac{SSLW^T}{SSLW^N} + \frac{SLA^T}{SLA^N}$$

Regardless, it is clear the hardiness index may be adapted and may be able to account for these differences in plant varieties.

For instance, plant seedlings with a H value between 3.01 to 15 could be identified as those which are displaying increased hardiness following treatment.

The lower H value of 3.01 reflects that each of the three values should display a value of over equal to or over 1, reflecting a positive change to the plant seedling as a result of UV treatment. Therefore, an H value of 15 represents a very significant improvement or prediction for plant hardiness.

A range of H values between 3.01 to 15 is considered to be beneficial because this range corresponds to overall plant characteristics that are more likely to withstand typical stresses in the outdoor environment.

Even small increases in the H value may mean comparatively large increases in relative hardiness characteristics. For example, an increase in the H value by 0.1, indicates a 10% increase in relative hardiness.

It should be appreciated that measuring the H value typically requires destruction of the plant seedling. Therefore, individual test seedlings from a batch may be used to determine a representative H value for the batch before selecting batches or individual plant seedlings from a batch.

Alternative Methods to Quantify or Predict Hardiness and/or Improved Crop Yield or Quality Alternative methods to evaluate or predict hardiness and/or yield of crop at harvest include:
- relative growth rate, or "RGR" (change in growth parameter between a first and second time point, divided by days between time points, expressed relative to original size at first time point (this is often used to measure the actual crop yield at the point of harvest)
- Incorporation of increases in leaf phenolic chemical content;
- Incorporation of increases in seedling photosynthetic health; and/or
- Incorporation of reduction of seedling hypocotyl length.

The Applicant has conducted preliminary trials in red lettuce, cucumber, tomato, eggplant and green lettuce.

The method of treatments as described herein and the use of the hardiness index and/or RGR were found to be particularly useful to illustrate the beneficial outcomes in relation to hardiness and/or subsequent increased crop yield or quality. Also, the methodology allows mechanisms for selecting seedlings or related seedlings undergoing the same or similar UV treatment for a subsequent growth phase or using a particular UV-dosage regime for subsequent seedling treatments.

For example, seedlings shown to first have an increased hardiness index often then go on to provide an increase in crop yield and quality.

Alternatively, subsequent treatments may be fine-tuned depending on the RGR of preliminary trials to further improve results.

Summary of Advantages
- only requires use of UV-B in a specific wavelength range to provide the beneficial results;
- the method is seen to beneficially improve crop yield and/or quality across a wide range of plants;
- the method is seen to increase seedling dry weight, increase in leaf weight or specific leaf weight and/or decreases in leaf area;
- the method also appears to protect the plants against stresses including weather damage, disease and insect pest attack that may otherwise be detrimental in vulnerable plants;
- The method is seen to work well with a wide variety of plants in preliminary studies.

BRIEF DESCRIPTION OF DRAWINGS

Further aspects of the present invention will become apparent from the following description which is given by way of example only and with reference to the accompanying drawings in which:

FIG. 1 Analysis of UV spectrum to provide beneficial hardiness outcome

BEST MODES FOR CARRYING OUT THE INVENTION

Example 1

Example Use of UV Light to Increase Hardiness and/or Crop Yield

Green lettuce plants were germinated in vermiculite, and upon appearance of cotyledons were transferred into a standard potting mixture. Plants were maintained under a visible light intensity of 400 µmol m$^{-2}$ s$^{-1}$ for 10 days, at a photoperiod of 14 hr/10 hr light/dark.

Plants were then exposed to a narrow-band UV dosage peaking at 290 nm using an LED (Light Emitting Diode) array. At the same time, a proportion of the same population of lettuce plants were exposed to a narrow-band UV dosage peaking at 354 nm using an LED (Light Emitting Diode) array.

The plants were exposed to a UV dosage for seven days at the same time as being exposed to background visible light. At the end of the seven days of UV treatment, plants were planted into a rotivated soil bed at an adjacent outdoor field site, with a selection of those plants destructively harvested for assessment of the three measured variables of average Hardiness Index (H).

The plants then remained in the field site, enduring field weather conditions for a period of 11 weeks. Six replicate plants were assessed at the end of the 11 weeks of field growth for whole shoot fresh weight, i.e. stem and leaves combined. Whole shoot fresh weight is a key indicator of final harvest yield size for many crop plants.

The results are shown in Table 1 below. It is evident that the sample treated with UV light at 290 nm according to the present invention shows a dramatic increase in total shoot fresh weight at 11 weeks in the field, compared to the sample treated with UV light at 354 nm (outside the UV-B spectrum).

Comparatively, the H value, determined using the hardiness index according to the present invention, at the end of the 7 day UV treatment phase, is shown to provide a useful prediction and/or selection method for long term plant hardiness and crop yield and/or quality.

In this example, the H value is 3.04 for the sample treated at 290 nm according to the present invention, compared to an H value of 2.96 for the sample treated at 354 nm. The difference of 0.08 between the two samples corresponds to a prediction of almost 10% increase in hardiness. This prediction corresponds well with the preliminary results seen in the field at 11 weeks post-transfer from the greenhouse.

Although only lettuce was tested in the preliminary study, it is expected that many other crops and/or other plants will display the same beneficial results seen. Ongoing trials are being performed in various vegetable crops and herbs to further exemplify the invention across different species.

TABLE 1

Plant hardiness response (mean of 6 plants ± 1 standard error)

| Hardiness index value (H) | Light treatment | Plant total shoot fresh weight (g) |
|---|---|---|
| 3.04 | 290 nm | 27.74* ± 4.0 |
| 2.96 | 354 nm | 16.65 ± 4.5 |

*indicates significant increase compared to 354 nm treatment according to t-test (P <0.05)

Example 2

Green Lettuce Disease and Field Assessed Fresh Weights

Green lettuce seedlings grown as described above, were planted 24 hrs after UV treatment (according to the present invention), into a lettuce field planting site carrying Sclerotina fungal disease. A moving light array treatment method was used according to New Zealand Patent Application Number 621039. The UV dosage regime included treatment for 7 days (12 hours on/12 hours off) in 2 week old plants using 0.16798 W m$^{-2}$ s$^{-1}$ [at a peak wavelength of 303 nm].

An assessment was carried out to determine the "hardiness" of the plants of the UV treated seedlings according to the present invention compared to untreated seedlings, 24 hrs after UV treatment had finished. The results in Table 2 show that leaf area (or 'SLA' as a component of Hardiness Index) was reduced in treated seedlings immediately following UV treatment, which is a indication that increased hardiness had been achieved.

TABLE 2

| Leaf area (cm$^2$) | UV | S.E. |
|---|---|---|
| UV | 11.07* | 0.40 |
| No UV | 13.38 | 0.36 |

*indicates significant decrease compared to No UV treatment according to t-test (P <0.05)

Disease incidence and fresh weight was then assessed in all plants at 5 weeks post treatment. Results are shown in Table 3 below.

The results show that the UV treated lettuce seedlings showed increased fresh weight, and also a greater resistance to the fungus, assessed by a rating scale, describing the number of plants that were displaying a particular severity of disease infection.

TABLE 3

| Fresh weight (g) | UV | S.E. | No UV | S.E. |
|---|---|---|---|---|
| Whole lettuce plant | 833.63* | 44.79 | 642.84 | 56.20 |
| Trimmed lettuce head | 672.42 | 41.07 | 577.32 | 41.92 |

*indicates significant decrease compared to No UV treatment according to t-test (P <0.05)

| | Number of plants | |
|---|---|---|
| Infection type | UV | No UV |
| No Infection | 9 | 3 |
| First signs of infection | 3 | 2 |

TABLE 3-continued

| Infected | 3 | 4 |
|---|---|---|
| Severely Infected | 1 | 7 |

Example 3

Red Lettuce Hardiness and Crop Yield Assessment

A trial was performed on red lettuce seedlings, grown and then field-planted after UV treatment as described above, to determine the effect of UV treatment as claimed compared to control groups. A moving light array treatment method was used according to New Zealand Patent Application Number 621039. The UV dosage regime included treatment for 7 days (12 hours on/12 hours off) at age 2 weeks using 0.06374 W m$^{-2}$ s$^{-1}$ [at a peak wavelength of 286 nm].

The results are shown below in Table 4. Following an outside standing period of 9 days, a H value of 3.08 was measured in UV-treated plants. In addition, the UV-treated samples showed clear improvements in fresh weight and leaf area compared to the No UV controls at 9 days post treatment, and at final harvest at 5 weeks post-field planting.

TABLE 4

| Variable | UV | S.E. | No UV | S.E. |
|---|---|---|---|---|
| post-UV treatment harvest [7 days] | | | | |
| Fresh Weight (g) | 0.62 | 0.05 | 0.71 | 0.07 |
| Leaf Area (cm$^2$) | 23.10 | 1.73 | 25.49 | 2.22 |
| Dry Weight (g) | 0.03 | 0.00 | 0.04 | 0.00 |
| Specific Leaf Weight | 0.00138 | 0.00005 | 0.00147 | 0.00005 |
| Harvest following outside standing period of 9 days | | | | |
| Fresh Weight (g) | 1.57 | 0.09 | 1.38 | 0.12 |
| Leaf Area (cm$^2$) | 46.43 | 2.26 | 42.95 | 3.31 |
| Dry Weight (g) | 0.11 | 0.01 | 0.10 | 0.01 |
| Specific Leaf Weight | 0.0023 | 0.0001 | 0.0023 | 0.0001 |
| Final harvest following field planting period of 5 weeks | | | | |
| Fresh Weight (g) | 7.35 | 1.04 | 6.54 | 0.82 |
| Leaf Area (cm$^2$) | 146.49 | 19.98 | 124.68 | 12.73 |

Example 4

Cucumber Hardiness and Crop Yield Assessment

A trial was performed on cucumber seedlings (using growing conditions as described above) to determine the effect of UV treatment as claimed compared to control groups. A moving light array treatment method was used according to New Zealand Patent Application Number 621039. The UV dosage regime included treatment for 7 days (12 hours on/12 hours off) at age 2 weeks using 0.06374 W m$^{-2}$ s$^{-1}$ [at a peak wavelength of 286 nm].

The results are shown below in Table 5. The UV-treated samples showed lower fresh weight at 7 days post treatment (during an outside growing period) than the No UV treated samples. Yet, by day 12, the UV treated sample displayed fresh weight values that were higher than those observed in the No UV treated sample. The leaf area of plants also increased more in the UV treated sample between day 7 and 12 in the UV treated sample compared to the untreated sample. This example illustrates the 'springboard' effect of the UV treatment method regarding plant productivity in the days (or weeks) following treatment.

TABLE 5

| Variable | UV | S.E. | No UV | S.E. |
|---|---|---|---|---|
| post-UV treatment harvest [7 days] | | | | |
| Fresh Weight (g) | 2.44 | 0.06 | 2.55 | 0.13 |
| Leaf Area (cm$^2$) | 56.89 | 1.19 | 53.04 | 3.51 |
| Dry Weight (g) | 0.21 | 0.01 | 0.19 | 0.02 |
| Specific Leaf Weight | 0.0036 | 0.0002 | 0.0039 | 0.0003 |
| Final harvest following outside standing period of 12 days | | | | |
| Fresh Weight (g) | 3.11 | 0.25 | 2.85 | 0.11 |
| Leaf Area (cm$^2$) | 63.86 | 6.70 | 56.56 | 3.22 |
| Dry Weight (g) | 0.25 | 0.02 | 0.23 | 0.01 |
| Specific Leaf Weight | 0.0040 | 0.0002 | 0.0042 | 0.0002 |

A further test was performed to assess cold tolerance in cucumber. The results are shown below in Table 6. The results show that the UV treatment according to the present invention led to an improved hardiness in the cucumber plants.

TABLE 6

Cold stress plant damage scoring following outside standing period of 12 days

| | Nil (0) | Low (1) | Med (2) | High (3) | Total infection ((1) + (2) + (3)) |
|---|---|---|---|---|---|
| UV | 65% | 18% | 12% | 4% | 35% |
| No UV | 14% | 37% | 31% | 18% | 86% |

Total of 49 plants per treatment assessed: % are number of plants with a particular stress score by 12 days Example 5

Tomato Hardiness and Crop Yield Assessment

A trial was performed on tomato seedlings (grown as described above) to determine the effect of UV treatment as claimed compared to control plants. A moving light array treatment method was used according to New Zealand Patent Application Number 621039. The UV dosage regime included treatment for 7 days (12 hours on/12 hours off) at age 3 weeks using 0.06374 W m$^{-2}$ s$^{-1}$ [at a peak wavelength of 286 nm].

The results are shown below in Table 7. When measured at 7 days, the UV-treated samples showed significant increases in fresh weight, leaf area and dry weight compared to the no-UV treatment samples. This equated to an overall H value of 3.55 at 7 days post UV-treatment. This is supportive that there will be an overall increased yield at harvest as a result of the UV treatment of the tomato seedlings. To illustrate this, a further harvest of plant biomass was taken after an outside standing period of 6 days. This harvest indicated that the described increases in plant growth continued beyond the completion of the UV treatment.

TABLE 7

| Variable | UV | S.E. | No UV | S.E. |
|---|---|---|---|---|
| post-UV treatment harvest [7 days] | | | | |
| Fresh Weight (g) | 1.06 | 0.34 | 0.46 | 0.08 |
| Leaf Area (cm$^2$) | 30.09 | 8.94 | 12.03 | 1.42 |
| Dry Weight (g) | 0.12 | 0.03 | 0.06 | 0.02 |
| Specific Leaf Weight | 0.0041 | 0.0002 | 0.0049 | 0.0008 |

TABLE 7-continued

| Variable | UV | S.E. | No UV | S.E. |
|---|---|---|---|---|
| Final harvest following outside standing period of 6 days | | | | |
| Fresh Weight (g) | 1.65 | 0.23 | 0.82 | 0.20 |
| Leaf Area (cm$^2$) | 38.47 | 5.01 | 18.12 | 2.83 |
| Dry Weight (g) | 0.19 | 0.03 | 0.10 | 0.02 |
| Specific Leaf Weight | 0.0047 | 0.0002 | 0.0058 | 0.0004 |

Example 6

Eggplant Hardiness and Crop Yield Assessment

A trial was performed on eggplant seedlings (grown as described above) to determine the effect of UV treatment as claimed compared to control groups. A moving light array treatment method was used according to New Zealand Patent Application Number 621039. The UV dosage regime included treatment for 7 days (12 hours on/12 hours off) at age 3 weeks using 0.06374 W m$^{-2}$ s$^{-1}$ [at a peak wavelength of 286 nm].

The results are shown below in Table 8. When measured at 7 days (immediately following UV treatment), the UV-treated samples showed similar or lower values in fresh weight, leaf area and dry weight compared to the no-UV treatment samples. Yet, by final harvest at 6 days, following an outside standing period of 6 days, fresh weight, leaf area, dry weight and specific leaf weight all had increased beyond the values seen in the No UV treatment samples. The beneficial results can therefore be observed from the Hardiness Index (or any one or number of variables relating to growth of the plant), showing an H value of 3.01 at the 7 day post-UV treatment harvest.

The data are supportive there will be an overall increased yield at harvest as a result of the UV treatment of the eggplant seedlings.

TABLE 8

| Variable | UV | S.E. | No UV | S.E. |
|---|---|---|---|---|
| post-UV treatment harvest [7 days] | | | | |
| Fresh Weight | 0.43 | 0.05 | 0.46 | 0.05 |
| Leaf Area | 13.72 | 1.52 | 14.45 | 1.32 |
| Dry Weight | 0.05 | 0.01 | 0.05 | 0.01 |
| Specific Leaf Weight | 0.0036 | 0.0004 | 0.0035 | 0.0004 |
| Final harvest following outside standing period of 6 days | | | | |
| Fresh Weight | 0.68 | 0.05 | 0.59 | 0.04 |
| Leaf Area | 17.94 | 1.32 | 17.55 | 1.44 |
| Dry Weight | 0.08 | 0.01 | 0.07 | 0.01 |
| Specific Leaf Weight | 0.0044 | 0.0001 | 0.0041 | 0.0001 |

Example 7

Assessing UV Spectrum for Beneficial Effects

An experiment was performed to assess the useful UV wavelength range for plant growth regulation (as a measure of hardiness) in green lettuce. This was measured by assessing shoot dry weight (as a component of the Hardiness index). Lettuce plants were grown as described above, and were exposed to a range of UV dosages (three doses for each wavelength) at selected wavelength peaks (which are listed in Table 9) using a series of LED (Light Emitting Diode) arrays for six days. Control plants which were not exposed to UV were used for comparison to UV treated plants. Whole shoot leaf dry weights were measured following the irradiation period. Shoot leaf dry weight measurements were expressed relative to untreated controls to deduce dosage responses per waveband. Following this, dose responses were developed based on dose range responses described above. The relative dose-based responses at the different wavelengths selected were then normalized to zero at 303 nm, and were interpolated to derive a description of the spectral response (or Quantum Effectiveness; in other words, an increased value indicates an increase in shoot dry weight for that given wavelength) for this aspect of hardiness. The results of this interpolation are in Table 10 and are plotted for ease of clarity in FIG. 1. It can be seen there is a sharp decline in improvements in this attribute of hardiness at a wavelengths below 290 nm, and the spectral response for this attribute of hardiness declines to <1.0 at 304 nm.

TABLE 9

| Wavelength (nm) | Relative quantum response | Normalized quantum effectiveness |
| --- | --- | --- |
| 290 | 0.9588 | 184.38 |
| 303 | 0.0052 | 1.00 |
| 319 | −0.0127 | −2.44 |
| 336 | −0.0172 | −3.31 |
| 354 | −0.0019 | −0.37 |

Table 10 shows a table of the interpolated quantum effectiveness for plant growth regulation of green lettuce. It should be appreciated that linear interpolation was used to interpolate quantum effectiveness values for this example, and that there are a variety of methods which may be used to interpolate between quantum effectiveness values.

TABLE 10

| Wavelength (nm) | Normalized quantum effectiveness |
| --- | --- |
| 290 | 184.38 |
| 291 | 170.28 |
| 292 | 156.17 |
| 293 | 142.07 |
| 294 | 127.96 |
| 295 | 113.85 |
| 296 | 99.75 |
| 297 | 85.64 |
| 298 | 71.53 |
| 299 | 57.43 |
| 300 | 43.32 |
| 301 | 29.21 |
| 302 | 15.11 |
| 303 | 1 |
| 304 | 0.923076923 |
| 305 | 0.846153846 |
| 306 | 0.769230769 |
| 307 | 0.692307692 |
| 308 | 0.615384615 |
| 309 | 0.538461538 |
| 310 | 0.461538462 |
| 311 | 0.384615385 |
| 312 | 0.307692308 |
| 313 | 0.230769231 |

TABLE 10-continued

| Wavelength (nm) | Normalized quantum effectiveness |
| --- | --- |
| 314 | 0.153846154 |
| 315 | 0.076923077 |
| 316 | 0 |
| 317 | 0 |
| 318 | 0 |
| 319 | 0 |
| 320 | 0 |
| 321 | 0 |
| 322 | 0 |
| 323 | 0 |
| 324 | 0 |
| 325 | 0 |
| 326 | 0 |
| 327 | 0 |
| 328 | 0 |
| 329 | 0 |
| 330 | 0 |
| 331 | 0 |
| 332 | 0 |
| 333 | 0 |
| 334 | 0 |
| 335 | 0 |
| 336 | 0 |
| 337 | 0 |
| 338 | 0 |
| 339 | 0 |
| 340 | 0 |
| 341 | 0 |
| 342 | 0 |
| 343 | 0 |
| 344 | 0 |
| 345 | 0 |
| 346 | 0 |
| 347 | 0 |
| 348 | 0 |
| 349 | 0 |
| 350 | 0 |
| 351 | 0 |
| 352 | 0 |
| 353 | 0 |
| 354 | 0 |

The shoot dry weight measurements were made at end of the 7 day irradiation treatment, and prior to the subsequent part of the plants' life in the outdoor environment. Wavelengths from 290-354 nm were used, and the preliminary results are shown in FIG. 1. In this preliminary study, a wavelength between 280-290 nm was not tested as the LEDs used had a lowest peak irradiation at 290 nm. However, it can be seen from the curve in FIG. 1 that an upwards trend towards 280 nm can be seen, and could be reasonably expected.

In a similar study (results shown in Table 11 below), it is shown that even minor fluctuations outside the claimed range of 280-310 nm UV-B wavelength can lead to substantial decrease in the Hardiness Index at the seedling stage (from 3.76 to 2.79), and losses and/or lack of improvement in plant leaf area at final harvest at 70 days (measured as % of non-treated control plants). Additionally, as per the interpolated example described above, seedling-stage plant dry weight was substantially improved within the desired treatment wavelength range.

TABLE 11

| | Seedling stage parameters [1 day after treatment] | | | | | Final harvest [70 days after treatment] |
|---|---|---|---|---|---|---|
| Wavelength (nm) | Shoot fresh weight (g) | Leaf area (cm$^2$) | Specific leaf weight | Shoot dry weight | Hardiness Index at seedling stage | Plant leaf area in treated plants as % of non-treated control plants |
| 290 | 0.463 | 10.43 | 0.0053 | 0.055 | 3.76 | 106 |
| 319 | 0.375 | 10.52 | 0.0029 | 0.031 | 2.79 | 99 |

Aspects of the present invention have been described by way of example only and it should be appreciated that modifications and additions may be made thereto without departing from the scope of the appended claims.

I claim:

1. A method of treating a plant seedling to improve at least one of long term hardiness and crop yield, comprising exposing the plant seedling to specific wavelengths of light in a first single waveband, characterized in that the first single waveband comprises ultraviolet-B (UV-B) light in a range of 280-290 nm,
   wherein at least one of long term hardiness and crop yield is improved,
   wherein the plant seedling is a fruit seedling or a vegetable seedling, and
   wherein the plant seedling is treated using UV-B light for a duration in the range of 2-15 days.

2. The method as claimed in claim 1, wherein the treatment of the plant seedling with UV light is performed indoors, and wherein the plant seedling is transplanted to an outdoor field subsequent to the treatment.

3. The method of claim 1, further comprising exposing the plant seedling to a second single waveband, characterized in that the second single waveband comprises red light in a range of 655-680 nm.

4. The method of claim 1, wherein a temperature is maintained at approximately 12° C. to 35° C. during the treatment.

5. The method of claim 1, wherein the UV-B light is co-administered with a wavelength in a blue visible spectrum in a range of 400 to 500 nm and a wavelength in a red visible spectrum in a range of 655-680 nm.

6. The method of claim 1, wherein said UV-B light is administered alone.

7. A method of treating a plant seedling to improve at least one of long term hardiness and crop yield, comprising exposing the plant seedling to specific wavelengths of light in a first single waveband, characterized in that the first single waveband comprises ultraviolet-B (UV-B) light in a range of 280-290 nm,
   wherein at least one of long term hardiness and crop yield is improved,
   wherein the plant seedling is a fruit seedling or a vegetable seedling, and
   wherein the plant seedling is exposed to the first single waveband for at least 12 hours each day.

* * * * *